Sept. 25, 1934.  A. Y. DODGE  1,974,563
BRAKE
Filed June 16, 1930

INVENTOR.
Adiel Y. Dodge
BY
J. W. McConkey
ATTORNEY.

Patented Sept. 25, 1934

1,974,563

UNITED STATES PATENT OFFICE 1,974,563

BRAKE

Adiel Y. Dodge, South Bend, Ind., assignor to Bendix Brake Company, South Bend, Ind., a corporation of Illinois Application June 16, 1930, Serial No. 461,371

9 Claims. (Cl. 188—78)

This invention relates to brakes and more particularly to internal expanding brakes.

An object of the invention is to provide a brake structure having relatively few parts assembled so that the brake will efficiently perform its intended function.

Another object of the invention is to provide an operating member for a brake structure which may be actuated to apply the friction elements with equal action between them.

Another object of the invention is to provide an operating member for a brake which may be easily and quickly adjusted to compensate for wear of the friction elements of the brake.

A further object of the invention is to provide a brake having a floating operating member which may be readily adjusted to effect a balanced action between the friction members of the brake.

A further object of the invention is to provide a brake structure having interchangeable friction elements and means for adjusting the elements so that they may be applied with equal force and effect.

A still further object of the invention is to provide a brake of the internal expanding type which has the advantage of a positive brake, is highly efficient in operation and yet of marked simplicity as a whole with respect to each of its component parts, so that its manufacture may be economically facilitated both as regards to parts and their assembly.

Other objects will appear from the following description taken in connection with the drawing, which forms a part of this specification, and in which.

Figure 1:
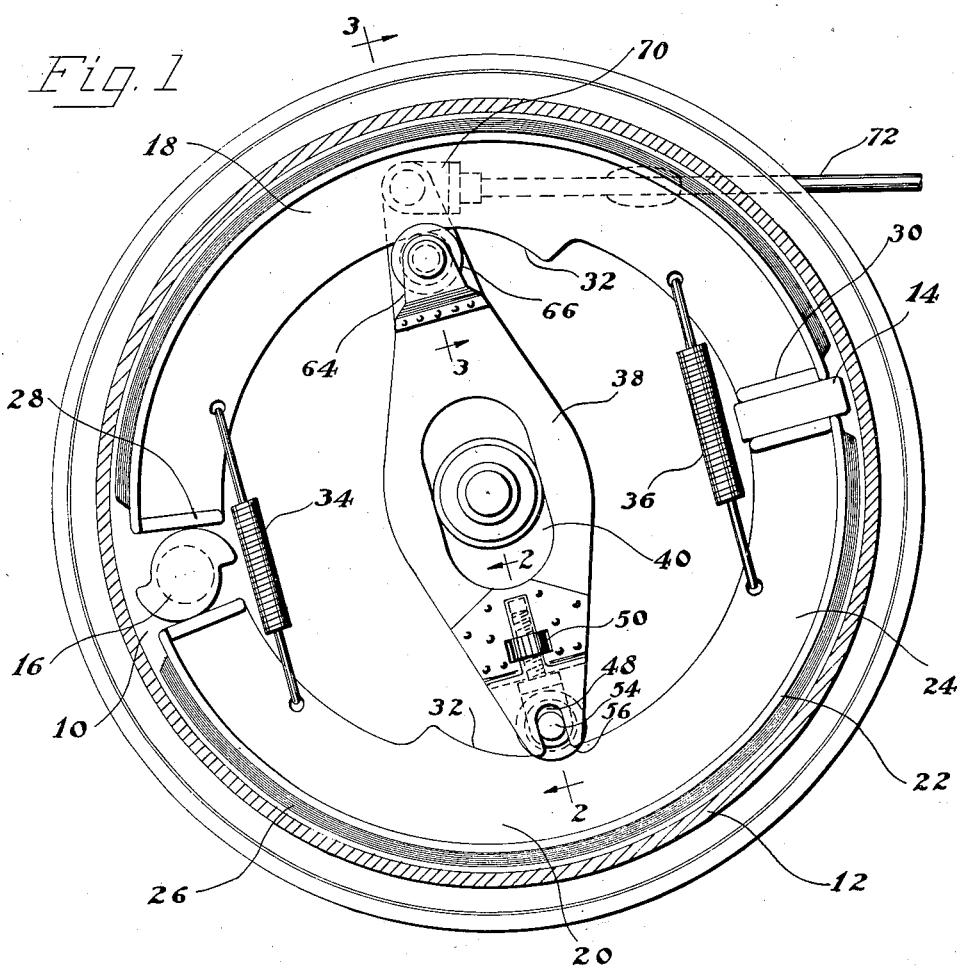
Figure 1 is a vertical sectional view of a brake taken just back of the head of the drum illustrating the friction elements and operating member in elevation.
Figure 2:
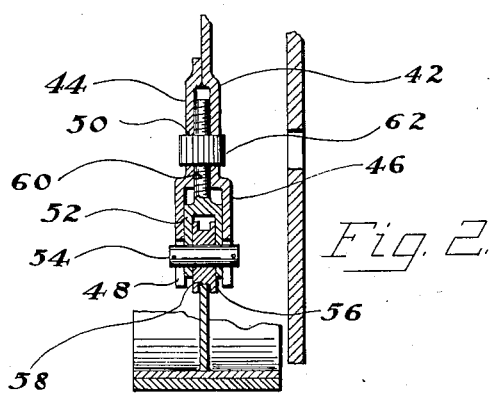
Figure 2 is a sectional view substantially on line 2—2, Figure 1.
Figure 3:
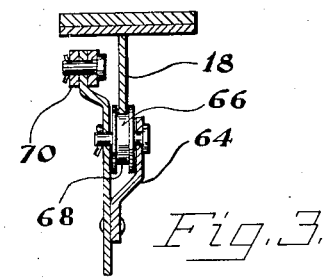
Figure 3 is a sectional view substantially on line 3—3, Figure 1.

Referring to the drawing for more specific details of the invention, 10 represents a fixed support such as a backing plate and associated with the backing plate is a rotatable drum 12. Positioned on the backing plate 10 is a fixed stop or anchor 14 and arranged in oppositely disposed relation thereto is a cam 16 having two lobes, the object of which will hereinafter appear.

Positioned for movement on the backing plate 10 are corresponding friction elements 18 and 20. These friction elements each comprise a rim 22 supported by a web 24 and a friction lining 26 suitably secured to the rim. As shown, the friction elements are provided with shoulders 28 and 30 arranged on their respective ends and adaptable for engagement with the anchor 14 and the cam 16 and suitably formed on the inner perimeter of the webs are cam surfaces 32.

The friction elements 18 and 20 are connected by coil springs 34 and 36. These springs serve to return the friction elements to the off position and to retain them when in the off position in engagement with the anchor 14 and the cam 16 in suitable spaced relation to the radius of the drum. The cam 16 may be readily adjusted to position the friction elements in proper relation to the drum.

Positioned on a spindle or an axle, as the case may be, is a yoke 38. As shown, the yoke is provided with a slot 40 adapted to receive the axle or spindle. The yoke is adapted to slide freely on the axle or spindle and to rotate thereon. The yoke has an offset portion 42 and secured to the yoke as by rivets or spot welding is a plate 44. The offset portion 42 and the plate 44 provide a bifurcated portion 46 having oppositely disposed slots 48 and 50, the object of which will hereinafter appear.

As shown, a yoke 52 is slidably positioned between the bifurcated ends. This yoke carries a shaft 54 on which is journalled a roller 56 having a circumferential groove 58 engaging the web of the friction element. The shaft 54 engages the slots 48 and the yoke is provided with a threaded stem 60 having thereon a nut 62 positioned in the slot 50. The other end of the yoke 38 has suitably secured thereto a plate 64 which, in conjunction with the yoke, provides a suitable support or bearing for a roller 66 having a circumferential groove 68 engaging the web on the friction element 18 and suitably secured to this end of the yoke as by a clevis 70 is an operating cable 72.

It is to be observed that the friction elements are so positioned that the respective cam surfaces 32 are arranged in oppositely disposed relation with respect to each other and that the operating member is so positioned on the axle or spindle, as the case may be, that when this member is actuated the respective rollers 56 and 66 will ride on the pitch of the cam. Since the operating member is provided with an adjusting means for one of the rollers, it will be readily understood that this member may be so adjusted as to apply the friction elements with predetermined pressure and since the operating means is free to slide on its axis, the applied pressure may be equalized between the friction elements to effectively apply the brakes.

In operation, a pull is imposed on the operating cable 72 and this force is applied to the yoke to rock the yoke on its axis and to cause the rollers carried thereby to travel on the webs of the respective friction elements on the pitch of the cam surfaces thereon. When the brake is released, the return springs function to return the friction elements against the anchors and such force causes the yoke to assume the off position through its engagement with the cam surfaces on the friction elements.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising friction elements, cams thereon arranged in reverse positions and a rotatable expansible member co-operating with the cams, said rotatable member being free to shift crosswise of the brake to balance its pressures on said elements.

2. A brake comprising friction elements, cam surfaces thereon arranged in reverse positions and an expansible member cooperating with the cam surfaces, said rotatable member having a threaded adjusting device operable to expand said member diametrically of the brake.

3. A brake comprising friction elements, cam surfaces thereon arranged in reverse positions, a diametrically floating expansible rotatable member positioned for rotation between the friction elements and members thereon engaging the cam surfaces.

4. A brake comprising a drum, corresponding friction elements each arranged to anchor at one end when the drum is turning in one direction and at the other end when the drum is turning in the other direction, cam surfaces arranged on the webs of the friction elements, a rotatable expansible operating member, and means carried by the operating member straddling the webs and adapted to travel on the cam surfaces.

5. A brake comprising corresponding friction elements, means for adjusting the relative position of the friction elements, cam surfaces arranged on the webs of the friction elements in reverse position with respect to each other, an operating member, means for expanding the member, means for rotating the member and means carried by the member engaging the cam surfaces.

6. A brake comprising a fixed support, a backing plate positioned thereon, a drum associated with the backing plate, corresponding friction elements positioned for movement on the backing plate, cam surfaces arranged on the friction elements in reverse position with respect to each other, a yoke slidably and rotatably mounted on the fixed support, means for rotating the yoke and means carried by the yoke co-operating with the cam surfaces.

7. A brake comprising a fixed support, a backing plate positioned thereon, a drum associated with the backing plate, friction elements positioned for movement on the plate and adaptable for co-operation with the drum, means for adjusting the relative position of the friction elements, cam surfaces arranged on the friction elements in reverse position with respect to each other, a yoke slidably and rotatably positioned on the fixed support, means for rotating the yoke, rollers positioned on the yoke engaging the cam surfaces and means for extending or retracting one of the rollers.

8. A brake comprising a pair of individually-shiftable shoes each anchoring at one end or the other, a rotatable member extending crosswise of the drum and operable to force said shoes outwardly and means for adjusting the effective length of the rotatable member.

9. A brake comprising a pair of individually-shiftable shoes each anchoring at one end or the other, and a rotatable member extending crosswise of the drum and operable to force said shoes outwardly and floating crosswise of the drum to balance its pressures on the shoes.

ADIEL Y. DODGE.